United States Patent Office 3,600,286
Patented Aug. 17, 1971

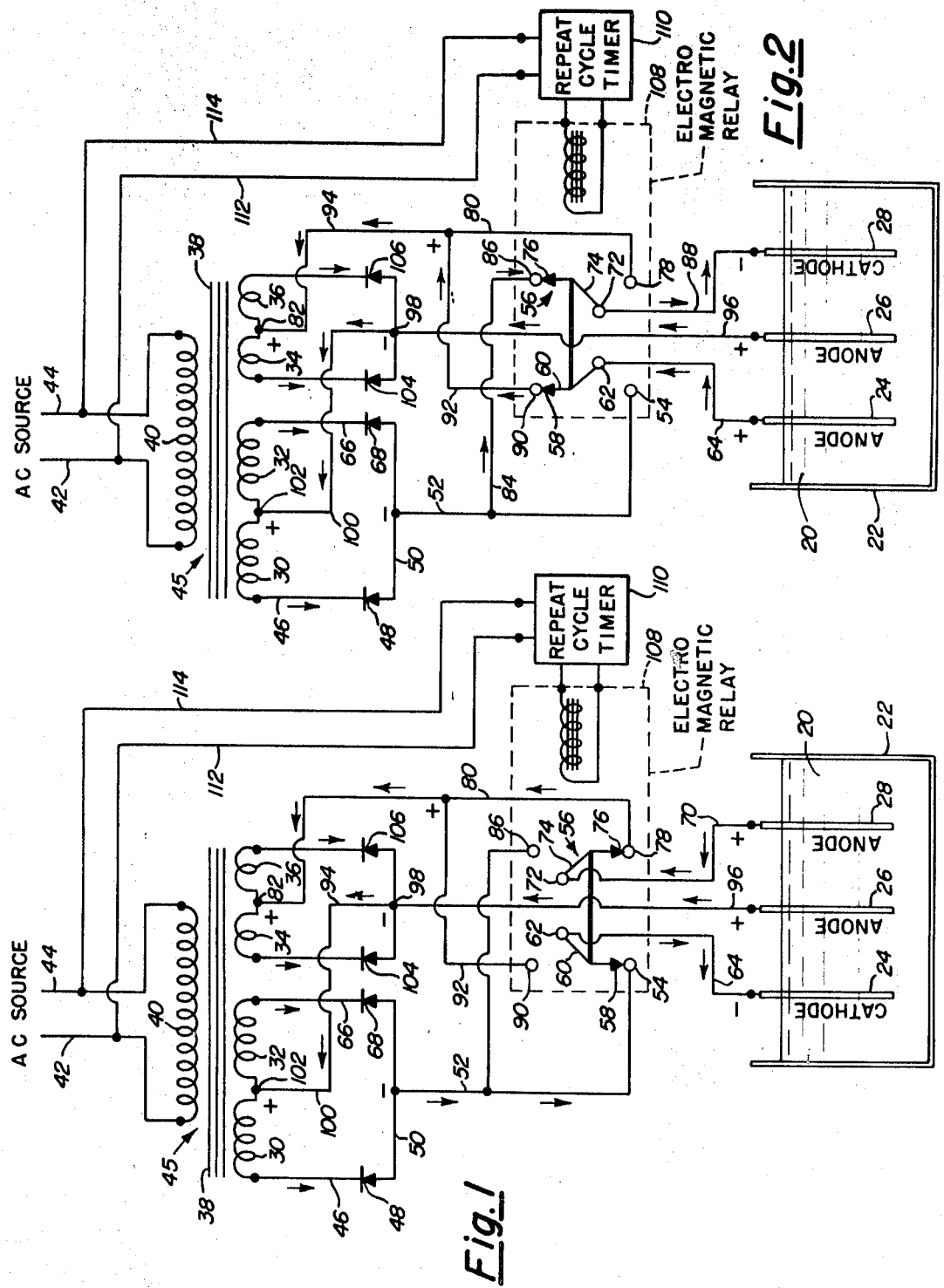

3,600,286
ELECTROLYTIC TREATMENT OF AQUEOUS SOLUTIONS
Rolland C. Sabins, Lakeside, Calif., assignor to Selectro-Chem Company, Salt Lake City, Utah
Filed Feb. 26, 1968, Ser. No. 708,185
Int. Cl. C02b 1/82; C01b 7/06
U.S. Cl. 204—149      7 Claims

ABSTRACT OF THE DISCLOSURE

The method of and system for liberating a gas or gases from an electrolyte through the use of two electrodes within the electrolyte and connected with a direct current to form, with the electrolyte, an internal circuit and cyclically reversing the polarity of the electrodes. The system further comprehends subjecting a third electrode to the electrolyte which is connected with the positive side of the direct current as long as the system is in operation.

BACKGROUND OF THE INVENTION

(1) Field of the invention

The invention is directed to the art of electrolysis.

(2) Description of the prior art

As far as applicant is aware, the practice in liberating gas by electrolysis has been to maintain one electrode constantly connected to the negative side of a source of direct current so that it functioned as a cathode, while the other electrode was maintained connected to the positive side of the source of direct current so it functioned as an anode.

In all such systems compounds were also liberated; and, under certain conditions a compound so liberated would adhere to an electrode and/or electrode mounting means, rendering certain systems uneconomical and others inoperative. By practicing the present invention, if compounds are liberated, they are liberated in such manner that they do not adhere to the anodes. Under certain conditions, as hereinafter explained, by practicing the present invention the gases are liberated but the compounds are not.

SUMMARY OF THE INVENTION

In practicing the present method and system, an electrode, while in the electrolyte, is first subjected to the negative side of a source of direct current, whereby it functions as a cathode, while simultaneously another electrode, which is in the same electrolyte, is subjected to the positive side of the source of direct current, whereby it functions as an anode. The polarities of these two electrodes are reversed cyclically. The time length of the cycles can be predetermined.

By this method, a certain gas is liberated at the electrodes when they function as cathodes, and a different gas is liberated at the electrodes when they function as anodes. The duration of the cycle is such that should other compounds be liberated from the electrolyte, they do not cling to the anodes.

Other features and the advantages of the present invention will be apparent from the following description, reference being made to the accompanying drawing wherein a preferred embodiment of the invention is illustrated.

BRIEF DESCRIPTION OF THE DRAWING

FIG. 1 is a diagrammatic view of the system by which the method is accomplished, showing the switching mechanism in a position in which one of the electrodes is functioning as a cathode; another electrode is functioning as an anode; and a third electrode is functioning as an anode; the arrows indicate the direction of the flow electrons; and FIG. 2 is a view similar to FIG. 1, but showing the switching mechanism in a position in which the polarities of the first and second mentioned electrodes are reversed.

DESCRIPTION OF THE PREFERRED EMBODIMENT

Referring more in detail to the drawing, the electrolyte is herein shown, as a liquid 20 in container 22. Three electrodes 24, 26 and 28 are disposed in the electrolyte. Direct current is impressed upon the electrodes in such manner that one electrode functions cyclically as a cathode and then an anode, while another functions cyclically and concomitantly as an anode and then a cathode.

In FIG. 1, electrode 24 is functioning as a cathode and electrode 28 is functioning as an anode. In FIG. 2 electrode 24 is functioning as an anode and electrode 28 is functioning as a cathode.

Direct currents are herein shown as being supplied through secondary windings 30, 32, 34 and 36 of a transformer 45. The primary winding 40 is energized from a source of alternating current by conductors 42 and 44. The iron core of the transformer is shown at 38.

As shown in FIG. 1, the electrode 24 is connected to the negative side of winding 30 by wire 46, a rectifier 48, wires 50 and 52, stationary contact 54 of double pole, double throw switch 56, movable contact 58 of the switch, switch blade 60, terminal 62 and wire 64. The negative side of winding 32 is connected in parallel with wire 46 and rectifier 48 by wire 66 and rectifier 68. The external circuit is completed from electrode 28, through wire 70, terminal 72 of switch 56, blade 74 movable contact 76, stationary contact 78 and wire 80, which latter is connected at terminal 82 to the positive side of both windings 34 and 36. The negative sides of windings 34 and 36 are connected in series relationship with the positive side of windings 30 and 32 through the rectifiers 104 and 106, terminal 98, wire 94, to the positive junction 102. The internal circuit is completed between electrodes 24 and 28 through the electrolyte. The combined circuits cause the electrode 24 to function as cathode and the electrode 28 to function as an anode.

Referring now to FIG. 2 in which the polarities of the electrodes 24 and 28 are reversed, where again the negative sides of windings 30 and 32 are in parallel as aforesaid. A wire 84 is connected with wire 52, and it is connected to a stationary contact 86 of the switch 56. The contact 86 is connected with electrode 28 by movable contact 76, blade 74, terminal 72 and wire 88. The external circuit is completed by wire 64, which is connected to anode 24, terminal 62, blade 60, movable contact 58, stationary contact 90 and wires 92 and 94, the latter being connected to the common positive terminal 82 for windings 34 and 36. The negative sides of windings 34 and 36 are connected in series relationship with the positive side of windings 30 and 32 through the rectifiers 104 and 106, terminal 98, wire 94, to the positive junction 102. The external circuit and the aforementioned internal circuit, cause the electrode 28 to function as an anode.

While electrolysis was accomplished by employing only electrodes 24 and 28, improved results were attained by the use of the third electrode 26, which always functions as an anode. In FIG. 1, an internal circuit is completed by electrode 24, functioning as a cathode, the electrolyte and the anode 26, and, in FIG. 2 an internal circuit is completed by electrode 28 functioning as a cathode, the electrolyte and the anode 26. The external circuit is completed by wire 96, junction 98 and wire 94, the latter being connected to the terminal 102 which is common to the positive side of windings 30 and 32. The electron flow from the anode 26 to the positive junction 102 between windings 30 and 32 is bucked by the low voltage electron flow generated at windings 34 and 36. The flow of electrons from the junction 98 to the negative side of windings 34 and 36 is prevented by rectifiers 104 and 106.

The double pole, double throw switch 56 is cylically moved from the position shown in FIG. 1 to that shown in FIG. 2, and from that shown in FIG. 2 to that shown in FIG. 1 by an electro-magnetic relay 108. This relay is controlled by a repeat cycle timer 110, which latter is energized by alternating current, it being connected to wires 42 and 44 by wires 112 and 114.

Among the many advantages derived from the present invention is the chlorination of private and commercial swimming pools with nascent chlorine whereby algae growth is eliminated and coliform bacteria, introduced by persons entering the pool, are controlled and prevented from multiplying. In one swimming pool having capacity in excess of 25,000 gallons, the growth of algae and bacteria cultures has been prevented for a duration of several months through a system employing the three electrodes, consuming only approximately 490 watts per hour for approximately eight night hours of every twenty-four hours. In that example, a residual chlorine indicated at approximately one part per million was maintained. The electrodes remained clean, and no visible compounds were released in the swimming pool water.

In that system, inert electrodes were used and the cumulative voltage impressed by windings 30 and 32 was twenty-six volts, direct current, and the series arrangement of the windings 34 and 36 which were one and six-tenths volts, direct current, added accumulative voltage to the series relationship, or a total of twenty-seven and six-tenths volts direct current being impressed between the electrodes 24 and 28 in FIG. 1. Concurrently, however, anode 26, being connected through wire 96 to terminal 98, was in series relationship with the windings 30 and 32 which are impressing twenty-six volts between it and the related cathode. Windings 34 and 36, however, were in opposition to the impressed potential of windings 30 and 32, thus reducing the voltage impressed between anode 26 and its respective cathode, depending on the polarities, to a reduced voltage of twenty-four and four-tenths volts.

The series relationships of the high voltage windings and the low voltage windings combined with the concurrent opposition relationship of the high voltage and low voltage windings resulted in the two electrodes serving as anodes to share the current passing between the anodes and cathodes almost equally on the surfaces of each anode, resulting in the anodes having only approximately one-half of the current density at their surfaces compared to the surface of the cathode. This is a very important feature if inert anodes such as platinized titanium anodes are used inasmuch as they become sacrificial when certain potentials or current densities are exceeded.

It will be recognized by those who are familiar with the art that the amperes of current that will flow between the electrodes and in the external circuit at these voltages is dependent on anode spacing, the salinity and temperature of the electrolyte, as well as the total electrode surfaces immersed in the electrolyte. During the aforesaid swimming pool tests, there were sufficient natural salts in the water to achieve a current density of approximately one ampere per square inch of electrode surfaces. It is to be understood that to achieve the desired results for certain processes the electrolytes may have to be conditioned with salts or chemicals.

It has been discovered in actual practice that in the aforesaid pool chlorinating method, if the duration of a polarity cycle was three seconds or less, i.e., one and one-half second phases, or less, gases are not liberated, and if the cycle was for a period of eighteen minutes or more, the resistance to the flow of current increased indicating that compounds other than gases were being liberated. Most satisfactory results were achieved when the complete time cycles were between five to six minutes, resulting in a duration of each half-time cycle of two or three minutes.

It is presumed that when the five to six minute cycles are employed in a fresh water electrolyte, oxygen as well as chlorine are liberated in the liquid at the electrodes when they function as anodes, and, hydrogen is liberated in the liquid at the electrodes when they function as cathodes. It is presumed also that the combination of the hydrogen and chlorine produces a hydrochloric combination that becomes soluble in the solution to effect the foregoing results. The pH of the aqueous solution is altered without liberating calcareous deposits or other compounds.

Another application is the chlorinating, for drinking purposes, of waters from domestic or commercial water sources, as well as sources encountered by the military units which are quite often under adverse conditions.

The method and system herein disclosed is highly useful in other areas of public and private services for controlling of bacteria and/or algae when essential to the public welfare, as for example, the chlorinating of sewage outfalls to avoid contamination of waterways, lakes and reservoirs.

It will, of course, be understood by those skilled in the art that the method and system can be used in many other processes where it is desirable to liberate and/or accumulate gases without depositing compounds, other than the gases, onto the electrodes, since such deposits in many cases render the system uneconomical and in many cases inoperative. A simple example of such use is the electrolysis of water to produce and collect oxygen and hydrogen.

Those skilled in the art will understand readily that the equipment has to be designed to the many different specific requirements. They must take into consideration the hardness or salts in the aqueous solution, the characteristics of many electrolytes, the desires to promote chemical changes, i.e., where liberation is desirable in any form of electrolyte without the accumulation of a compound or compounds on the electrodes.

It will be understood that all electrodes can be placed in the electrolyte, such as in the water in the pool, or all can be placed in a relatively small container. The water is pumped from the pool into the container and the water and the desired liberated gas or gases are returned to the pool.

Those skilled in the art will understand readily that it may be desirable or necessary under certain conditions or in the use of some electrolytes to employ sacrificial electrodes instead of the inert type.

While the embodiment herein shown and described constitutes a preferred form and a resulting preferred method, it is to be understood that other forms may be adopted falling within the scope of the structural claims that follow and capable of performing the method claims that follow.

I claim:

1. A method for treating an aqueous solution containing dissolved chloride, comprising:
   inserting three electrodes into the solution;
   applying a potential across a first and second of said electrodes so that one of said electrodes is negative and the other of said electrodes is positive;
   applying a positive potential to the third said electrode sufficient to liberate chlorine at its surface due to the potential difference between the said third electrode and the negative of the first and second electrodes; and
   cyclically reversing the polarity of the first and second electrodes, the duration of each cycle being selected to effectively depolarize the positive (formerly negative) of said first and second electrodes while avoiding the deposition of compounds on the negative of said first and second electrodes.

2. A method according to claim 1, wherein the duration of each cycle is between about 3 seconds and about 18 minutes.

3. A method according to claim 1, wherein the positive potential alternately applied to the first and second said electrodes is of greater magnitude than the positive potential applied to the third said electrode.

4. A method according to claim 2, wherein the duration of each cycle is up to about 6 minutes.

5. A method according to claim 4, wherein the duration of each cycle is between about 5 and about 6 minutes.

6. A method according to claim 3, wherein the duration of each cycle is between about 3 seconds and about 18 minutes.

7. A method according to claim 6, wherein the duration of each cycle is up to about 6 minutes.

References Cited

UNITED STATES PATENTS

| | | | |
|---|---|---|---|
| 3,340,175 | 9/1967 | Mehl | 204—268 |
| 3,192,146 | 6/1965 | Vellas et al. | 204—240 |
| 1,529,249 | 3/1925 | Gue | 204—228A |
| 943,188 | 12/1909 | Hartman | 204—149 |
| 3,305,472 | 2/1967 | Oldershaw et al. | 204—178 |

JOHN H. MACK, Primary Examiner

R. L. ANDREWS, Assistant Examiner

U.S. Cl. X.R.

204—128, 228, 231